(12) United States Patent
Baba et al.

(10) Patent No.: US 10,369,907 B2
(45) Date of Patent: Aug. 6, 2019

(54) SEAT FRAME FOR VEHICLE

(71) Applicant: TS TECH CO., LTD., Asaka-shi, Saitama (JP)

(72) Inventors: Hiroshi Baba, Tochigi (JP); Takaya Kurisu, Tochigi (JP); Yuki Hosokawa, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 15/746,198

(22) PCT Filed: Aug. 2, 2016

(86) PCT No.: PCT/JP2016/072598
§ 371 (c)(1),
(2) Date: Jan. 19, 2018

(87) PCT Pub. No.: WO2017/022737
PCT Pub. Date: Feb. 9, 2017

(65) Prior Publication Data
US 2018/0208087 A1 Jul. 26, 2018

(30) Foreign Application Priority Data
Aug. 4, 2015 (JP) .................................. 2015-154472

(51) Int. Cl.
*B60N 2/427* (2006.01)
*B60N 2/68* (2006.01)
(Continued)

(52) U.S. Cl.
CPC ......... *B60N 2/42709* (2013.01); *B60N 2/002* (2013.01); *B60N 2/16* (2013.01);
(Continued)

(58) Field of Classification Search
CPC .................................................. B60N 2/42709
See application file for complete search history.

(56) References Cited

U.S. PATENT DOCUMENTS 6,709,053 B1 * 3/2004 Humer ................. B60N 2/4228
297/216.1
9,132,800 B2 * 9/2015 Watanabe ................ B60N 2/68
(Continued)

FOREIGN PATENT DOCUMENTS

JP   2013-006579 A   1/2013
JP   2013-132917 A   7/2013
(Continued)

OTHER PUBLICATIONS

Extended European Search Report issued in related application EP 16833016.5, dated Jul. 3, 2018, 6 pages.

*Primary Examiner* — Timothy J Brindley
(74) *Attorney, Agent, or Firm* — Drinker Biddle & Reath LLP

(57) ABSTRACT

Right and left brackets coupling a seat back frame and seat cushion frame together are configured to adjust an amount of deformation upon impact absorption. A vehicle seat frame includes a seat cushion frame, seat back frame, coupling bracket configured to couple a cushion side frame as a side frame of the seat cushion frame on one side of the vehicle seat frame and a seat back side frame as a side frame of the seat back frame on the one side, and coupling bracket configured to couple a cushion side frame as a side frame of the seat cushion frame on the other side and a seat back side frame as a side frame of the seat back frame on the other side. Deformability upon impact absorption is different between a weak portion provided at the coupling bracket and a weak portion provided at the coupling bracket.

9 Claims, 9 Drawing Sheets

(51) Int. Cl.
   *B60N 2/16* (2006.01)
   *B60N 2/90* (2018.01)
   *B60N 2/42* (2006.01)
   *B60N 2/00* (2006.01)

(52) U.S. Cl.
   CPC ............ *B60N 2/427* (2013.01); *B60N 2/4228* (2013.01); *B60N 2/68* (2013.01); *B60N 2/682* (2013.01); *B60N 2/90* (2018.02)

(56) References Cited

U.S. PATENT DOCUMENTS

| | | | | |
|---|---|---|---|---|
| 2010/0096892 | A1* | 4/2010 | Meghira | B60N 2/4214 297/216.14 |
| 2011/0074189 | A1* | 3/2011 | Sawada | B60N 2/20 297/216.1 |
| 2013/0187417 | A1* | 7/2013 | Seo | B60N 2/68 297/216.13 |
| 2013/0200666 | A1* | 8/2013 | Huttemann | B60N 2/42709 297/216.1 |
| 2013/0307301 | A1* | 11/2013 | Munemura | B60N 2/4228 297/216.13 |
| 2014/0070578 | A1* | 3/2014 | Szelagowski | B60N 2/427 297/216.13 |
| 2014/0103626 | A1* | 4/2014 | Seki | B60N 2/4228 280/730.2 |
| 2015/0042133 | A1* | 2/2015 | Munemura | B60N 2/4228 297/216.14 |
| 2015/0091346 | A1 | 4/2015 | Kitou | |
| 2015/0165939 | A1 | 6/2015 | Seki et al. | |
| 2015/0202998 | A1 | 7/2015 | Komatsubara et al. | |
| 2015/0306989 | A1 | 10/2015 | Ito | |

FOREIGN PATENT DOCUMENTS

| | | |
|---|---|---|
| JP | 2014-100996 A | 6/2014 |
| JP | 2015-003574 A | 1/2015 |
| JP | 2015-067168 A | 4/2015 |
| WO | 2013/133245 A1 | 9/2013 |
| WO | 2013/133246 A1 | 9/2013 |

\* cited by examiner

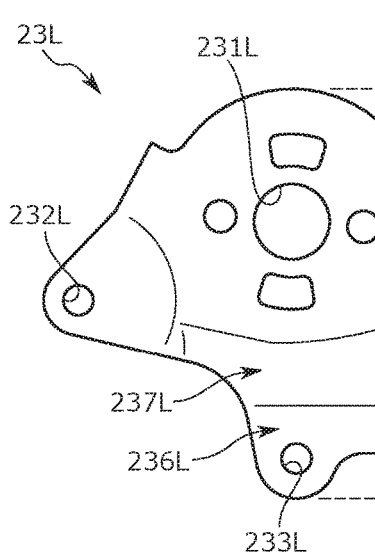
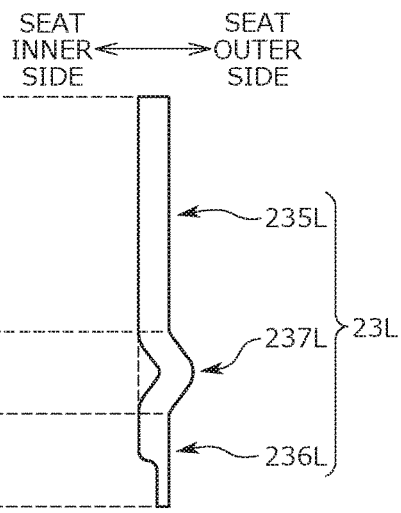
FIG. 6A  FIG. 6B
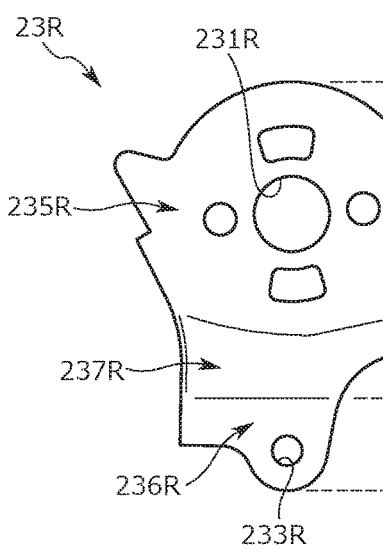
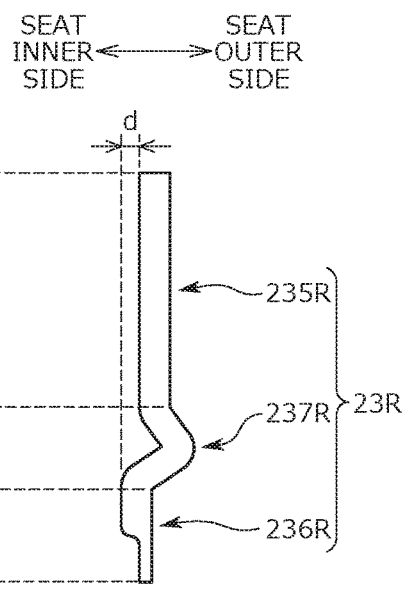
FIG. 7A  FIG. 7B

SEAT FRAME FOR VEHICLE

CROSS REFERENCE TO RELATED APPLICATIONS

This application is a National Stage Entry application of PCT Application No. PCT/JP2016/072598, filed Aug. 2, 2016, which claims the priority benefit of Japanese Patent Application No. JP 2015-154472, filed Aug. 4, 2015, the contents being incorporated herein by reference.

BACKGROUND

The present disclosure relates to a vehicle seat frame, and particularly relates to a vehicle seat frame configured such that a frame deformation amount upon a rear collision is adjustable.

There is a mechanism configured to enhance safety of a passenger by impact absorption of a vehicle seat frame upon rear collision. For example, in a vehicle seat frame described in Patent Application Publication WO 2013/133245 described below, a bracket configured to couple a seat back frame and a seat cushion frame has a weak portion, and upon rear collision, impact is absorbed by deformation of the weak portion.

However, particularly in the case where components attached to right and left frames of the seat cushion frame as a framework of a seating portion are different from each other, load on the bracket is different between the right and left brackets coupling the seat back frame and the seat cushion frame. For this reason, the right and left brackets might not deform equally upon rear collision.

SUMMARY

The present disclosure has been made in view of the above-described problem, and provides an embodiment of a vehicle seat frame configured such that deformation amounts of right and left brackets upon impact absorption are adjustable, the right and left brackets coupling a seat back frame and a seat cushion frame.

The above-described problem is solved by an embodiment of a vehicle seat frame including a seat cushion frame, a seat back frame, a first coupling bracket configured to couple a first cushion side frame as a side frame of the seat cushion frame on one side of the vehicle seat frame and a first seat back side frame as a side frame of the seat back frame on the one side, and a second coupling bracket configured to couple a second cushion side frame as a side frame of the seat cushion frame on another side of the vehicle seat frame and a second seat back side frame as a side frame of the seat back frame on the other side. Deformability upon impact absorption is different between a first weak portion provided at the first coupling bracket and a second weak portion provided at the second coupling bracket.

In the above-described vehicle seat frame, the deformability between the weak portions of the right and left coupling brackets coupling the seat cushion frame and the seat back frame is differentiated, and therefore, the amount of deformation of each of the right and left coupling brackets upon impact absorption can be adjusted.

In the above-described vehicle seat frame, the first weak portion and the second weak portion may be different from each other in their respective shapes. With this configuration, the amount of deformation of each of the right and left coupling brackets upon impact absorption can be adjusted according to the shapes of the first and second weak portions.

In the above-described vehicle seat frame, the first coupling bracket may include a first seat-back-side coupling region having a portion to be coupled to the first seat back side frame, a first cushion-side coupling region having a portion to be coupled to the first cushion side frame, and the first weak portion, the first weak portion connecting the first seat-back-side coupling region and the first cushion-side coupling region together and being bent outward from the vehicle seat frame with respect to the first seat-back-side coupling region and the first cushion-side coupling region, and the second coupling bracket may include a second seat-back-side coupling region having a portion to be coupled to the second seat back side frame, a second cushion-side coupling region having a portion to be coupled to the second cushion side frame, and the second weak portion, the second weak portion connecting the second seat-back-side coupling region and the second cushion-side coupling region together and being bent outward from the vehicle seat frame with respect to the second seat-back-side coupling region and the second cushion-side coupling region. With this configuration, each of the weak portions of the right and left coupling brackets is bent outward from the vehicle seat frame upon impact absorption so that impact on the seat back frame can be reduced.

In the above-described vehicle seat frame, an offset amount in a seat width direction between a surface forming the first seat-back-side coupling region and a surface forming the first cushion-side coupling region at the first coupling bracket may be different from an offset amount in the seat width direction between a surface forming the second seat-back-side coupling region and a surface forming the second cushion-side coupling region at the second coupling bracket. With this configuration, the offset amount of each of the first and second weak portions is adjusted so that the deformability of each weak portion can be controlled.

In the above-described vehicle seat frame, the surface forming the first seat-back-side coupling region and the surface forming the first cushion-side coupling region may be positioned within a same plane, and the surface forming the second cushion-side coupling region may be positioned inward or outward from the vehicle seat frame with respect to the surface forming the second seat-back-side coupling region. With this configuration, the second weak portion provided at the second coupling bracket can be more easily deformable upon impact absorption as compared to the first weak portion provided at the first coupling bracket.

In the above-described vehicle seat frame, the second weak portion may be formed to be more easily deformable upon impact absorption as compared to the first weak portion. With this configuration, in a case where a stronger load is applied to the first coupling bracket than to the second coupling bracket upon a rear collision, a balance in the deformation amount between the second coupling bracket and the first coupling bracket can be achieved.

In the above-described vehicle seat frame, a main driving portion of a height adjustment mechanism configured to adjust the height of the seat may be provided only at the first cushion side frame of the first and second cushion side frames. With this configuration, the second coupling bracket to which a load of the main driving portion of the height adjustment mechanism is not applied is more easily deformable than the first coupling bracket to which the load of the main driving portion of the height adjustment mechanism is applied, and therefore, the first coupling bracket and the second coupling bracket upon impact absorption can be deformed with a favorable balance.

In the above-described vehicle seat frame, a seating sensor mechanism configured to detect seating of a passenger may be provided only at the first cushion side frame of the first and second cushion side frames. With this configuration, the second coupling bracket to which a load corresponding to the seating sensor mechanism is not applied is more easily deformable than the first coupling bracket to which the load corresponding to the seating sensor mechanism is applied, and therefore, the first coupling bracket and the second coupling bracket upon impact absorption can be deformed with a favorable balance.

Moreover, the above-described problem is solved by an embodiment of a vehicle seat frame including a seat cushion frame, a seat back frame, a first coupling bracket configured to couple a first cushion side frame as a side frame of the seat cushion frame on one side of the vehicle seat frame and a first seat back side frame as a side frame of the seat back frame on the one side, and a second coupling bracket configured to couple a second cushion side frame as a side frame of the seat cushion frame on an other side of the vehicle seat frame and a second seat back side frame as a side frame of the seat back frame on the other side A weak portion is provided at only one of the first or second coupling bracket. According to the above-described vehicle seat frame, the deformability is differentiated between the right and left coupling brackets coupling the seat cushion frame and the seat back frame, and therefore, the amount of deformation of each of the right and left coupling brackets upon impact absorption can be adjusted.

According to the present disclosure, the deformability is differentiated between the weak portions of the right and left coupling brackets coupling the seat cushion frame and the seat back frame, and therefore, the amount of deformation of each of the right and left coupling brackets upon impact absorption can be adjusted.

According to an embodiment of the present disclosure, the amount of deformation of each of the right and left coupling brackets upon impact absorption can be adjusted according to the respective shapes of the first and second weak portions.

According to an embodiment of the present disclosure, each of the weak portions of the right and left coupling brackets is bent outward from the vehicle seat frame upon impact absorption so that the impact on the seat back frame can be reduced.

According to an embodiment of the present disclosure, the offset amount of each of the first and second weak portions is adjusted so that the deformability of each weak portion can be controlled.

According to an embodiment of the present disclosure, the second weak portion provided at the second coupling bracket can be more easily deformable upon impact absorption as compared to the first weak portion provided at the first coupling bracket.

According to an embodiment of the present disclosure, in the case where a stronger load is applied to the second coupling bracket than to the first coupling bracket upon rear collision, the balance in the deformation amount between the second coupling bracket and the first coupling bracket can be achieved.

According to an embodiment of the present disclosure, the second coupling bracket to which a load of the main driving portion of the height adjustment mechanism is not applied is more easily deformable than the first coupling bracket to which the load of the main driving portion of the height adjustment mechanism is applied, and therefore, the first coupling bracket and the second coupling bracket upon impact absorption can be deformed with a favorable balance.

According to an embodiment of the present disclosure, the second coupling bracket to which the load corresponding to the seating sensor mechanism is not applied is more easily deformable than the first coupling bracket to which the load corresponding to the seating sensor mechanism is applied, and therefore, the first coupling bracket and the second coupling bracket upon impact absorption can be deformed with a favorable balance.

According to the present disclosure, the deformability is differentiated between the weak portions of the right and left coupling brackets coupling the seat cushion frame and the seat back frame, and therefore, the amount of deformation of each of the right and left coupling brackets upon impact absorption can be adjusted.

BRIEF DESCRIPTION OF DRAWINGS

Various embodiments of the invention are illustrated in the drawings, in which:

FIGS. 6A and 6B are front and side views, respectively, of a coupling bracket configured to couple a frame provided with a main driving portion of the height adjustment mechanism;

FIGS. 7A and 7B are front and side views, respectively, of a coupling bracket configured to couple a frame not provided with the main driving portion of the height adjustment mechanism;

DETAILED DESCRIPTION

A vehicle seat and a vehicle seat frame as a framework of the vehicle seat according to various embodiments of the present disclosure are described below with reference to FIGS. 1 to 11.

The present embodiment relates to a vehicle seat frame including a seat cushion frame, a seat back frame, a first coupling bracket configured to couple a first cushion side frame as a side frame of the seat cushion frame on one side of the vehicle seat frame and a first seat back side frame as a side frame of the seat back frame on the one side, and a second coupling bracket configured to couple a second cushion side frame as a side frame of the seat cushion frame on the other side of the vehicle seat frame and a second seat back side frame as a side frame of the seat back frame on the other side. A first weak portion provided at the first coupling bracket and a second weak portion provided at the second coupling bracket are configured to have different deformability upon an impact absorpotion. Note that in the embodiments described below, a case where the vehicle seat frame of the present disclosure is applied as a vehicle seat frame is described as examples.

Note that in the description below, a "front-to-back direction" means a front-to-back direction when viewed from a person seated on the vehicle seat, and is a direction coincident with a vehicle traveling direction. A "seat width direction" means a transverse width direction of the vehicle seat, and is coincident with a right-to-left direction when viewed from the person seated on the vehicle seat. Moreover, in description below, a "left" indicates a left when viewed from the seated person, and similarly, a "right" indicates a right when viewed from the seated person. Further, a "height direction" means a height direction of the vehicle seat, and is coincident with an upper-to-lower direction when the vehicle seat is viewed from the front.

Figure 1:
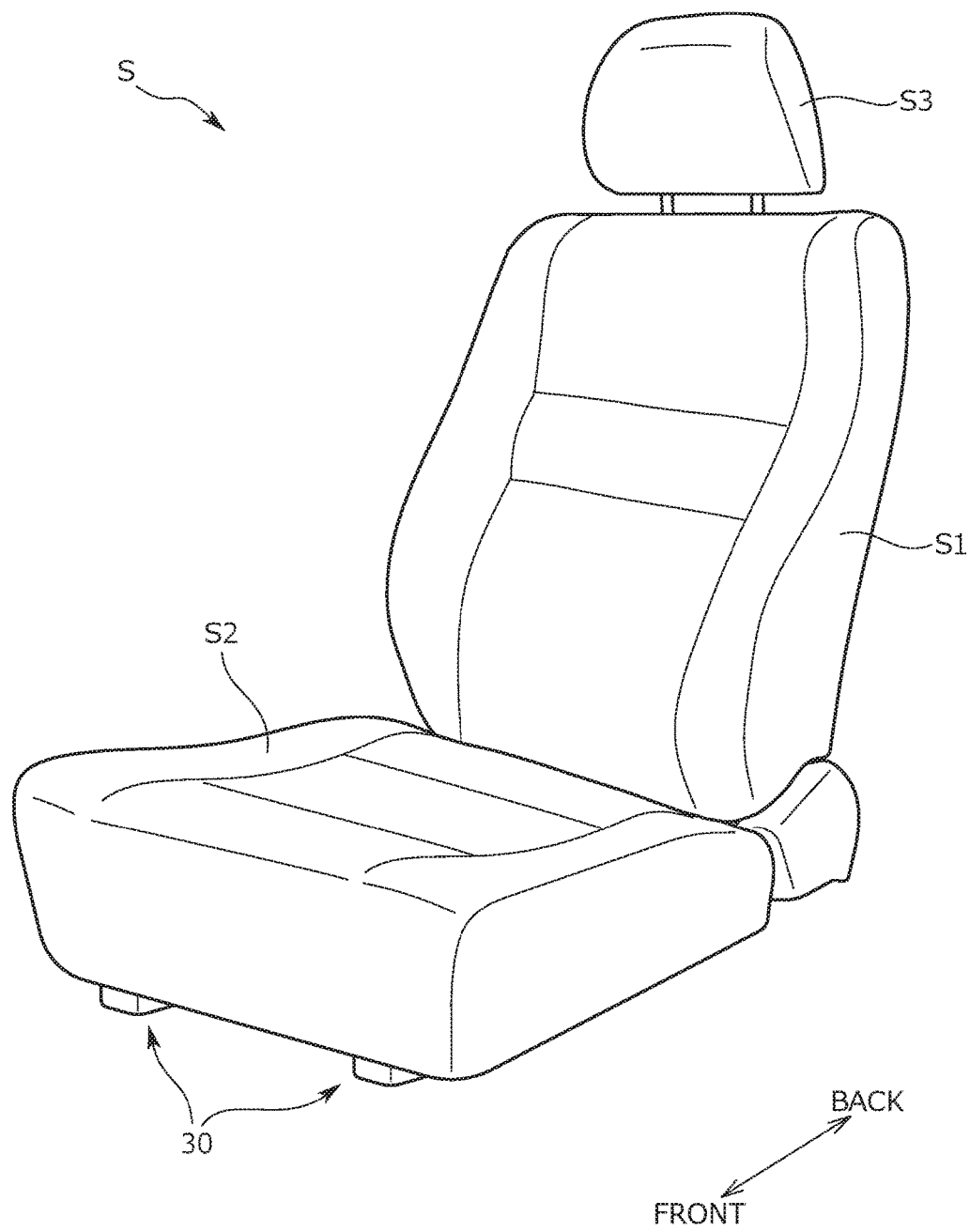
FIG. 1 is a perspective view for describing a basic configuration of a vehicle seat of a first embodiment.

First, a basic configuration of a vehicle seat S of the present embodiment is described based on FIG. 1. As illustrated in FIG. 1, the vehicle seat S has a seat back S1, a seat cushion S2, and a head rest S3. Moreover, slide rail mechanisms 30, configured to slidably move a seat body (a main portion of the vehicle seat S) in the front-to-back direction, are arranged at a lower portion of the seat cushion S2. Further, the vehicle seat S has, as a framework thereof, a vehicle seat frame F1 illustrated in FIG. 2. The vehicle seat frame F1 includes, as main components, a seat back frame 10 and a seat cushion frame 20.

The seat back frame 10 has an inverted U-shaped upper frame 11, a seat back side frame 12L (equivalent to a first seat back side frame) forming a left end portion in the seat width direction, a seat back side frame 12R (equivalent to a second seat back side frame) forming a right end portion in the seat width direction, and a lower member frame 13 that bridges between lower end portions of the seat back side frame 12L and the seat back side frame 12R. Moreover, a reclining shaft 14 of a reclining mechanism is set between the lower end portions of the seat back side frame 12L and the seat back side frame 12R with the reclining shaft 14 penetrating the seat back side frame 12L and the seat back side frame 12R.

The seat cushion frame 20 has an outer shape in a rectangular frame shape when viewed from above. The seat cushion frame 20 includes, as main components, a cushion side frame 21R (equivalent to a first cushion side frame) positioned at a left end portion in the seat width direction, a cushion side frame 21L (equivalent to a second cushion side frame) positioned at a right end portion in the seat width direction, and a pan frame 22 forming a front end portion of the seat cushion frame 20. Moreover, an upper back end portion of the cushion side frame 21L is attached to the lower end portion of the seat back side frame 12L through a coupling bracket 23L. Similarly, an upper back end portion of the cushion side frame 21R is attached to the lower end portion of the seat back side frame 12R through a coupling bracket 23R. Although details are described below, each of the coupling bracket 23L and the coupling bracket 23R has a weak portion configured in a suitable shape such that the weak portion is easily deformable upon impact input. For example, the weak portions of the coupling bracket 23L and the coupling bracket 23R are crushed upon a rear collision of a vehicle in which the vehicle seat S is installed so that impact can be efficiently absorbed.

Figure 2:
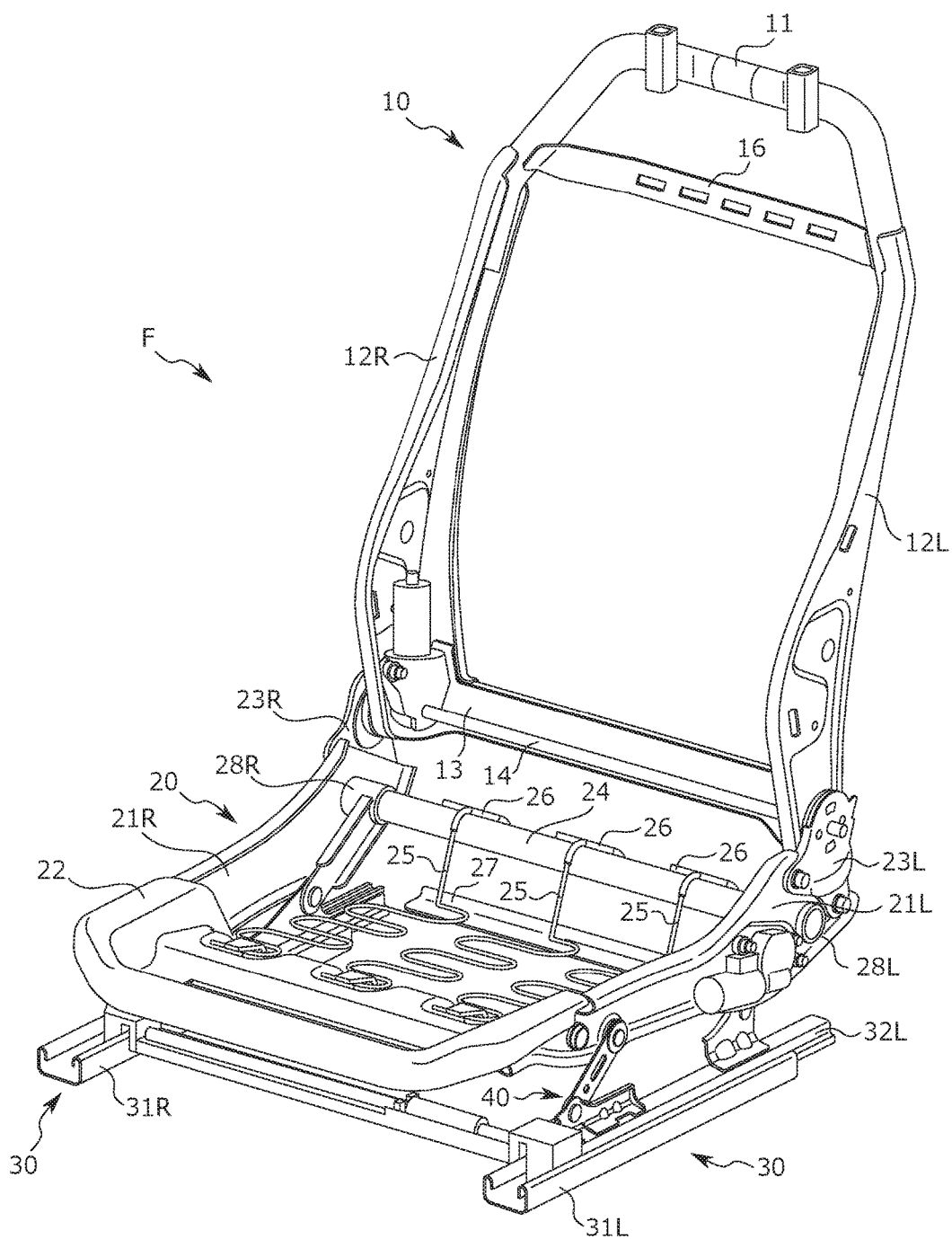
FIG. 2 is a perspective view of a vehicle seat frame of the first embodiment.

Further, as illustrated in FIG. 2, lower back end portions of the cushion side frame 21L and the cushion side frame 21R are coupled together through a member extending along the seat width direction. This member is a coupling pipe 24 as a hollow member, and specifically includes a round pipe. Moreover, both end portions of the coupling pipe 24 in the seat width direction are supported by the cushion side frame 21L and the cushion side frame 21R through an end sleeve 28L and an end sleeve 28R as tubular members.

In addition, a plurality of S-springs 25 as buttock support members are provided between the cushion side frame 21L and the cushion side frame 21R, the S-springs 25 being arranged in the seat width direction. Each S-spring 25 is provided for supporting the buttocks of a passenger as the person seated on the vehicle seat S, and extends along the front-to-back direction. Moreover, front end portions of the S-springs 25 are fixed to an upper end surface of the pan frame 22. Further, back end portions of the S-springs 25 are fastened at the above-described coupling pipe 24 through engagement hooks 26 and an L-angled fixing bracket 27, the engagement hooks 26 and the fixing bracket 27 being arranged between the cushion side frame 21L and the cushion side frame 21R.

The vehicle seat S of the present embodiment includes a height adjustment mechanism 40 configured to adjust the height of the seat cushion S2. The height adjustment mechanism 40 is disposed between the seat cushion frame 20 and an upper rail 32L of the slide rail mechanism 30 in the upper-to-lower direction. When the passenger executes height adjustment operation (e.g., the operation of pressing a not-shown up-and-down button), movable portions (for example, a main driving link 41, a driven link 43, etc. as described below) of the height adjustment mechanism 40 are operated. In this manner, the height of the seat body including the seat cushion S2 is adjusted.

Figure 3:
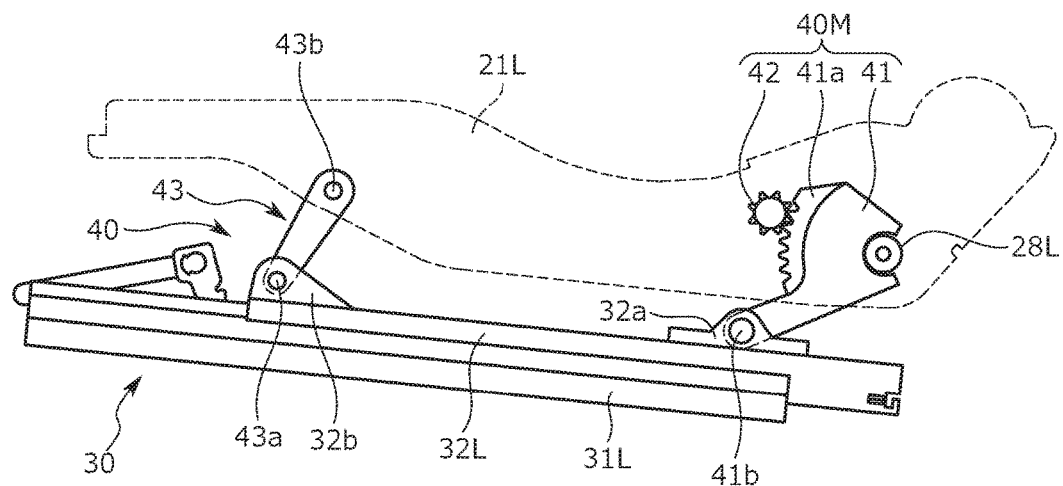
FIG. 3 is a side view for describing a height adjustment mechanism.
Figure 4:
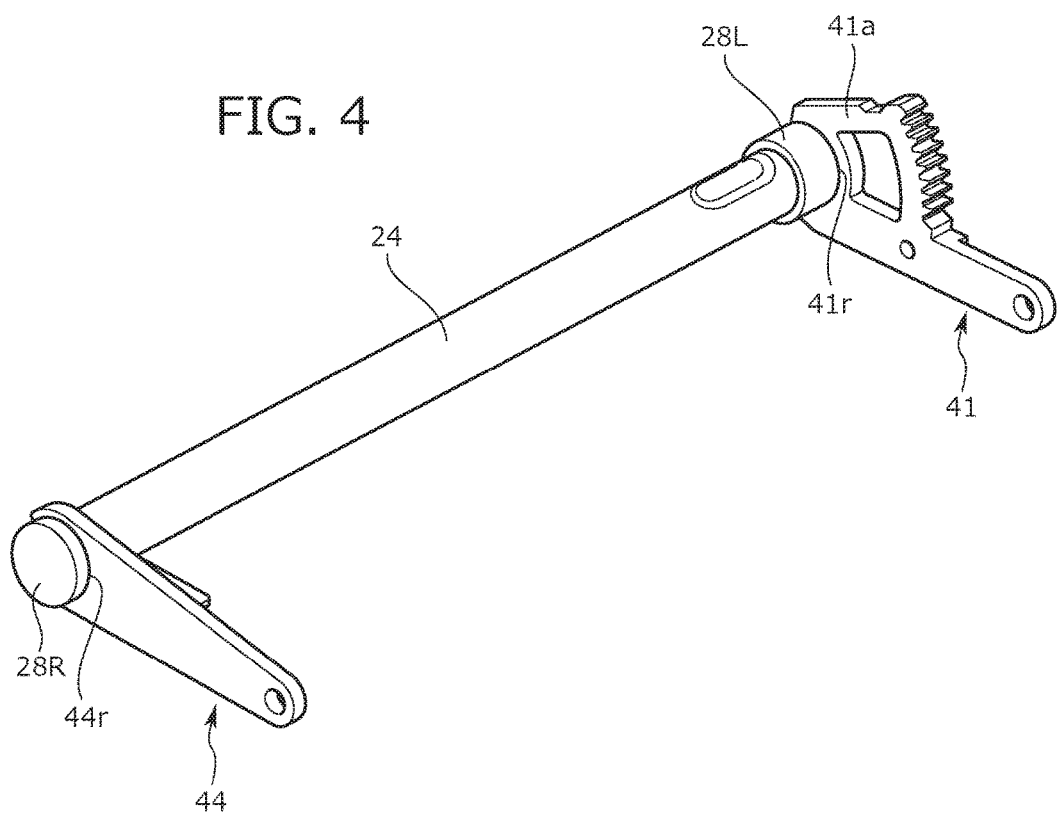
FIG. 4 is a perspective view for describing the height adjustment mechanism.

A configuration of the height adjustment mechanism 40 of the present embodiment is described below with reference to FIGS. 3 and 4. As illustrated in FIGS. 3 and 4, the height adjustment mechanism 40 has the main driving link 41, a pinion gear 42, and the driven links 43, 44. The main driving link 41 and the driven links 43, 44 swing together with the seat cushion S2 in the front-to-back direction and the upper-to-lower direction.

The main driving link 41 includes a metal plate member. Of the cushion side frame 21L and the cushion side frame 21R forming the seat cushion frame 20, the outer cushion side frame in the seat width direction (in the present embodiment, the cushion side frame 21L) is disposed at a position closer to the main driving link 41. Moreover, one end portion of the main driving link 41 in a longitudinal direction thereof is, through a pivot pin 41b, swingably supported by a link support portion 32a positioned on an upper surface of the upper rail 32L. Further, the other end portion of the main driving link 41 in the longitudinal direction has a substantially fan-shaped outer shape as illustrated in FIGS. 3 and 4. In addition, a front end portion of the substantially fan-shaped other end portion of the main driving link 41 in the longitudinal direction has gear teeth. That is, the other end portion of the main driving link 41 in the longitudinal direction forms a sector gear 41a, and engages with the pinion gear 42 as illustrated in FIG. 3. The pinion gear 42 is rotatably attached to the cushion side frame 21L provided at the seat cushion frame 20. Moreover, the pinion gear 42 is coupled to a drive motor attached to the cushion side frame 21L. Note that a mechanism portion including the main driving link 41, the sector gear 41a, and the pinion gear 42 and configured to mainly operate the height adjustment mechanism 40 is a main driving portion 40M, and a mechanism portion configured to adjust the height of the seat in response to operation by the main driving portion 40M is a driven portion.

The driven link 43 (equivalent to the driven portion of the height adjustment mechanism 40) includes a metal plate member, and is a link configured to swing in response to swinging operation of the main driving link 41. The driven link 43 is supported to swing relative to each of the cushion side frame 21L of the seat cushion frame 20 and the upper rail 32L. Specifically, one end portion of the driven link 43 in a longitudinal direction thereof is, as illustrated in FIG. 3, swingably supported through a pivot pin 43a by a link support portion 32b placed on the upper surface of the upper rail 32L. Moreover, as illustrated in FIG. 3, the other end portion of the driven link 43 in the longitudinal direction is swingably supported through a pivot pin 43b by a lower end portion of the cushion side frame 21L.

Moreover, the driven link 44 (equivalent to the driven portion of the height adjustment mechanism 40) is paired with the main driving link 41 as illustrated in FIG. 4. Specifically, the main driving link 41 and the driven link 44 are coupled together through the coupling pipe 24, the end sleeve 28L, and the end sleeve 28R. More specifically, one of longitudinal end portions of the main driving link 41 provided with the sector gear 41a has, at a back portion thereof, a semicircular cutout portion 41r. The end sleeve 28L is fitted in the cutout portion 41r with one end portion of the coupling pipe 24 in the seat width direction being fitted in the end sleeve 28L, and both of these components are fixed by welding. On the other hand, one of the longitudinal end portions of the driven link 44 supported by the cushion side frame 21R has, at a back portion thereof, a semicircular cutout portion 44r. The end sleeve 28R is fitted in the cutout portion 44r with the other end portion of the coupling pipe 24 in the seat width direction being fitted in the end sleeve 28R, and both of these components are fixed by welding.

Operation of the height adjustment mechanism 40 configured as described above is described. The passenger as the person seated on the seat executes the height adjustment operation (e.g., the operation of pressing the not-shown up-and-down button), and accordingly, the drive motor coupled to the pinion gear 42 is driven to rotate the pinion gear 42. When the pinion gear 42 rotates, the position of engagement between the pinion gear 42 and the sector gear 41a changes. Accordingly, the main driving link 41 and the driven links 43, 44 swing. In this state, the end sleeves 28L, 28R welded to the main driving link 41 and the driven link 44 and the coupling pipe 24 fitted in the end sleeves 28L, 28R swing together. Thus, the cushion side frame 21L and the cushion side frame 21R of the seat cushion frame 20 rotate about the center of rotation, i.e., the center axes of the coupling pipe 24, the end sleeve 28L, and the end sleeve 28R, relative to the coupling pipe 24, the end sleeve 28L, and the end sleeve 28R. As a result, the seat cushion frame 20 moves up and down, and therefore, the height of the seat body is adjusted.

Figure 5:
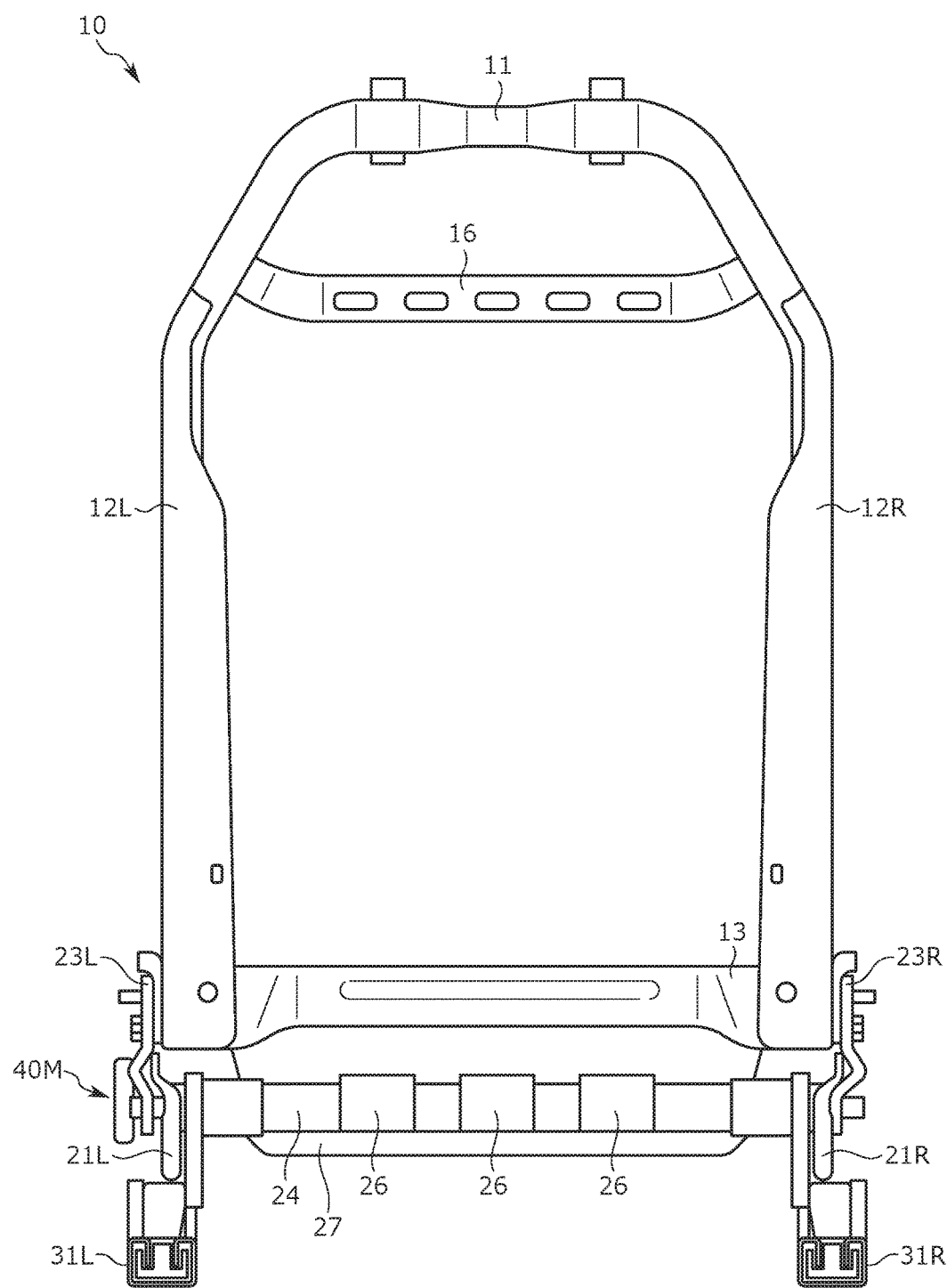
FIG. 5 is a back view of the vehicle seat frame of the first embodiment.

FIG. 5 illustrates a back view of the vehicle seat frame F1 of the first embodiment. The back view illustrated in FIG. 5 corresponds to a view when the vehicle seat frame F1 is viewed from the back of the seat back frame 10. As illustrated in FIG. 5, the main driving portion 40M of the height adjustment mechanism 40 is, in the vehicle seat frame F1, attached only to the cushion side frame 21L of the cushion side frames 21L, 21R. For example, upon a rear collision, more impact load is applied, increased by an impact load corresponding to the main driving portion 40M, to the coupling bracket 23L attached to the cushion side frame 21L as compared to an impact load applied to the coupling bracket 23R attached to the cushion side frame 21R. Thus, if the coupling bracket 23L and the coupling bracket 23R are made of similar materials in similar shapes with similar degrees of deformability, the amount of deformation of the coupling bracket 23L is greater than that of the coupling bracket 23R, and therefore, there is a likelihood that the vehicle seat frame F1 does not equally deform in the right-to-left direction. For this reason, in the vehicle seat frame F1, mechanisms of the weak portions provided at the coupling bracket 23L and the coupling bracket 23R are differentiated from each other, and in this manner, the coupling bracket 23L and the coupling bracket 23R are different from each other in deformability. Configurations of the coupling bracket 23L and the coupling bracket 23R are described below in detail with reference to FIGS. 6 and 7.

FIG. 6A illustrates a front view and FIG. 6B illustrates a side view of the coupling bracket 23L coupling the frame provided with the main driving portion 40M of the height adjustment mechanism 40. Moreover, FIG. 7A illustrates a front view and FIG. 7B illustrates a side view of the coupling bracket 23R coupling the frame not provided with the main driving portion 40M of the height adjustment mechanism 40.

As illustrated in FIG. 6A, the coupling bracket 23L has a shaft through-hole 231L for the reclining shaft 14 and with bolt fastening holes 232L, 233L through each of which a bolt for fastening the cushion side frame 21L and the coupling bracket 23L together penetrates. Note that the reclining mechanism is attached to the reclining shaft 14, and the seat back frame 10 is coupled to the coupling bracket 23L through the reclining mechanism.

Moreover, as illustrated in FIGS. 6A and 6B, the coupling bracket 23L has a seat-back-side coupling region 235L (equivalent to a first seat-back-side coupling region) forming a portion to be coupled to the seat back side frame 12L and including the shaft through-hole 231L, a cushion-side coupling region 236L (equivalent to a first cushion-side coupling region) forming (a portion of) a portion to be coupled to the cushion side frame 21L and including the bolt fastening hole 233L, and a weak portion 237L (equivalent to a first weak portion) connecting the seat-back-side coupling region 235L and the cushion-side coupling region 236L together and bent outward from the vehicle seat frame with respect to the seat-back-side coupling region 235L and the cushion-side coupling region 236L.

As illustrated in FIG. 6B, an end surface of the seat-back-side coupling region 235L in a seat inward direction (a seat inward direction in the case of attaching the coupling bracket 23L to the vehicle seat frame F1) and an end surface of the cushion-side coupling region 236L in the seat inward direction are present within the same plane, and an offset amount indicating displacement of these end surfaces in the seat width direction is substantially zero. That is, the weak portion 237L is in such a shape that a portion connected to the seat-back-side coupling region 235L and a portion connected to the cushion-side coupling region 236L are positioned within the substantially same plane in the seat width direction.

Next, as illustrated in FIG. 7A, the coupling bracket 23R has a shaft through-hole 231R for the reclining shaft 14 and with bolt fastening holes 232R, 233R through each of which a bolt for fastening the cushion side frame 21R and the coupling bracket 23R together penetrates. Note that the reclining mechanism is attached to the reclining shaft 14, and the seat back frame 10 is coupled to the coupling bracket 23R through the reclining mechanism.

Moreover, as illustrated in FIGS. 7A and 7B, the coupling bracket 23R has a seat-back-side coupling region 235R (equivalent to a second seat-back-side coupling region) forming a portion to be coupled to the seat back side frame 12R and including the shaft through-hole 231R, a cushion-side coupling region 236R (equivalent to a second cushion-side coupling region) forming (a portion of) a portion to be coupled to the cushion side frame 21R and including the bolt fastening hole 233R, and a weak portion 237R (equivalent to a second weak portion) connecting the seat-back-side coupling region 235R and the cushion-side coupling region 236R together and bent outward from the vehicle seat frame with respect to the seat-back-side coupling region 235R and the cushion-side coupling region 236R.

As illustrated in FIG. 7B, an end surface of the seat-back-side coupling region 235R in a seat inward direction (a seat inward direction in the case of attaching the coupling bracket 23R to the vehicle seat frame F1) and an end surface of the cushion-side coupling region 236R in the seat inward direction are not present within the same plane, and an offset amount indicating displacement of these end surfaces in the seat width direction is d (greater than zero). That is, the end surface of the cushion-side coupling region 236R is positioned inward of the seat with respect to the end surface of the seat-back-side coupling region 235R. In other words, the weak portion 237R is in such a shape that a portion connected to the cushion-side coupling region 236R is positioned inward of the seat with respect to a portion connected to the seat-back-side coupling region 235R. Alternatively, the weak portion 237R may be in such a shape that the portion connected to the cushion-side coupling region 236R is positioned outward from the vehicle seat frame with respect to the portion connected to the seat-back-side coupling region 235R.

As described above, the offset amount of the coupling bracket 23R is set greater than that of the coupling bracket 23L, and therefore, the coupling bracket 23R (the weak portion 237R) is more easily deformable as compared to the coupling bracket 23L (the weak portion 237L). In other words, the offset amount of the coupling bracket 23R is set greater than that of the coupling bracket 23L, and therefore, the coupling bracket 23L is less deformable as compared to the coupling bracket 23R. As described above, the coupling bracket 23L is formed to be less deformable than the coupling bracket 23R by an impact load corresponding to the main driving portion 40M, and therefore, adjustment can be made such that a deformation amount becomes equal between the coupling bracket 23L and the coupling bracket 23R.

Next, a vehicle seat frame F2 of a second embodiment of the present disclosure is described with reference to FIGS. 8 and 9. The vehicle seat frame F2 of the second embodiment is different from the vehicle seat frame F1 of the first embodiment in that not a height adjustment mechanism 40 but a seating sensor mechanism 50 configured to detect whether a passenger is seated is provided between a cushion side frame 21L and an upper rail 32L, but is the same as the vehicle seat frame F1 on other points. Differences are mainly described below.

Figure 8:
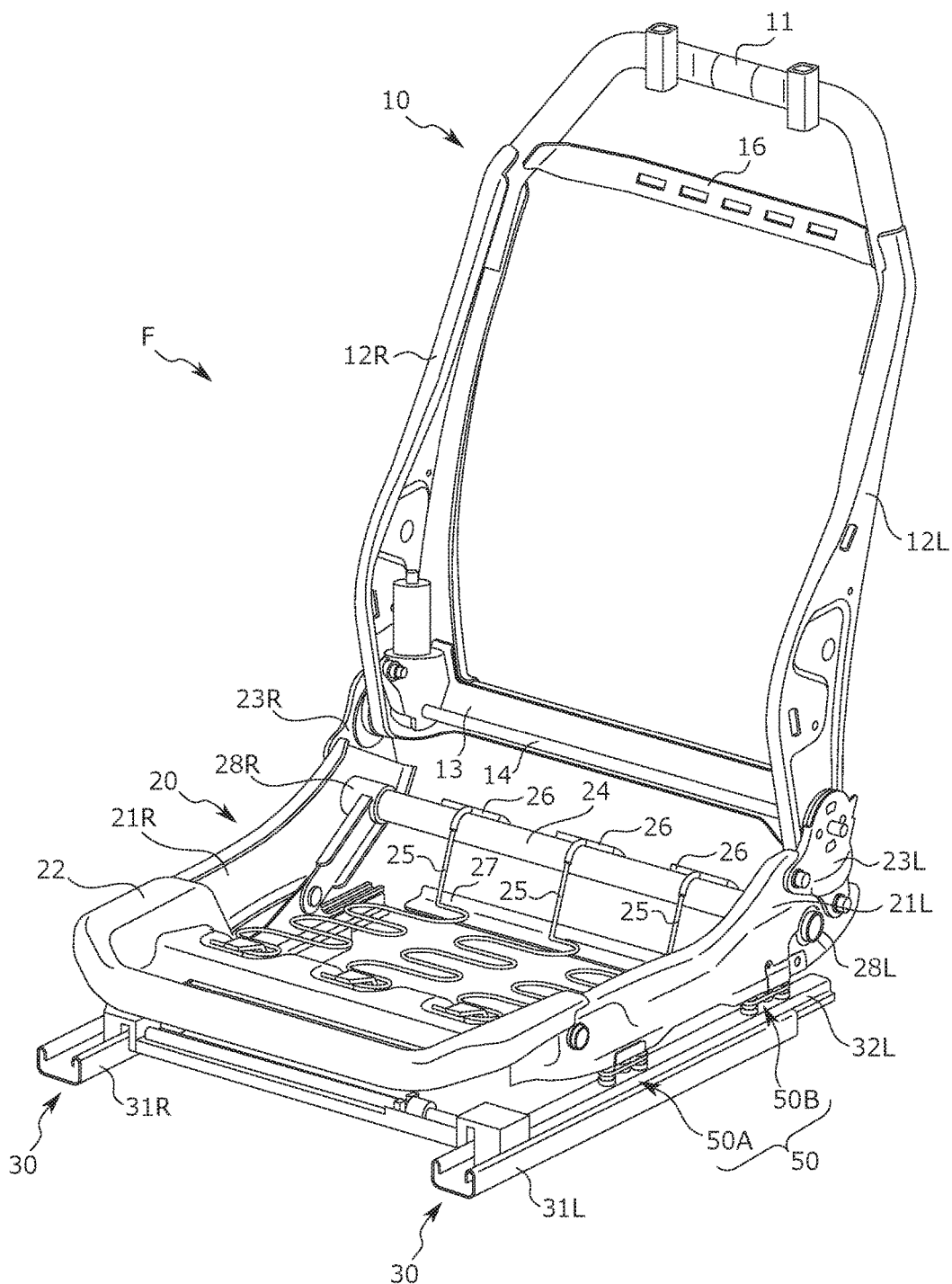
FIG. 8 is a perspective view of a vehicle seat frame of a second embodiment.
Figure 9:
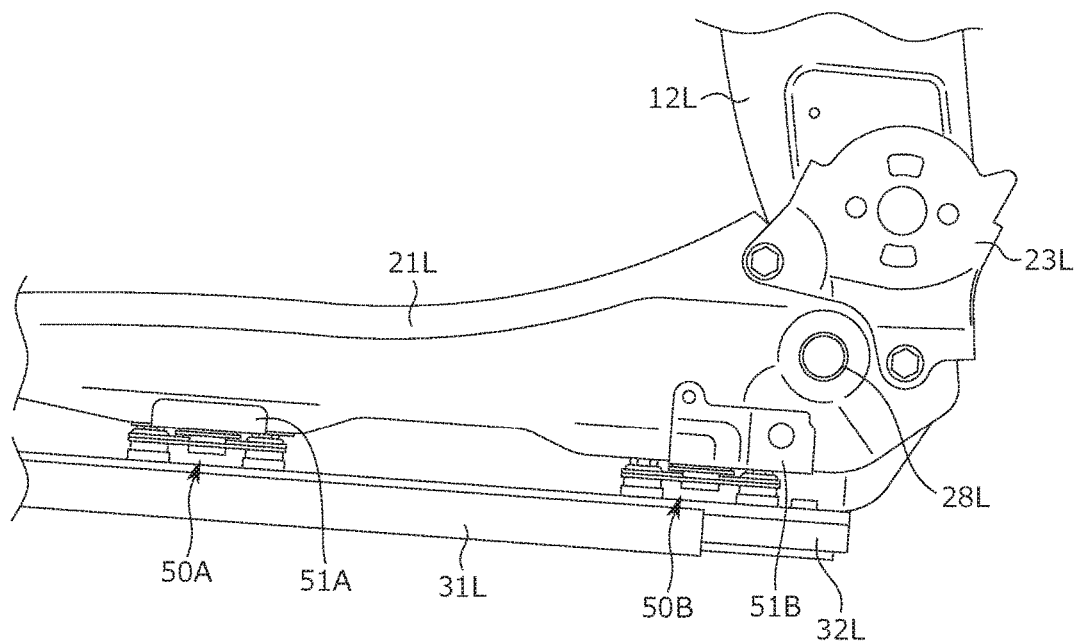
FIG. 9 is a partial side view of an attachment portion of a seating sensor.

FIG. 8 illustrates a perspective view of the vehicle seat frame F2 of the second embodiment, and FIG. 9 illustrates a partial side view of an attachment portion of the seating sensor mechanism 50.

In the vehicle seat frame F2 of the second embodiment, the seating sensor mechanism 50 is provided only at an outer one (in the present embodiment, the cushion side frame 21L) of the cushion side frame 21L and a cushion side frame 21R in the seat width direction, the cushion side frame 21L and the cushion side frame 21R forming a seat cushion frame 20.

As illustrated in FIGS. 8 and 9, the seating sensor mechanism 50 includes a seat position sensor 50A provided at a seat front portion, and a seat weight sensor 50B provided at a seat back portion. As illustrated in FIG. 9, an upper portion of the seat position sensor 50A is attached to the cushion side frame 21L through a bracket 51A, and a lower portion of the seat position sensor 50A is provided in contact with the upper rail 32L. Note that the position of the passenger in the seat front-to-back direction can be detected by the seat position sensor 50A.

Moreover, as illustrated in FIG. 9, an upper portion of the seat weight sensor 50B is attached to the cushion side frame 21L through a bracket 51B, and a lower portion of the seat weight sensor 50B is provided in contact with the upper rail 32L. Note that the weight of an object loaded on a seat and the position of the center of gravity of the object loaded on the seat can be detected by the seat weight sensor 50B.

As described above, in the vehicle seat frame F2 of the second embodiment, the seating sensor mechanism 50 is attached only to the cushion side frame 21L of the cushion side frames 21L, 21R. Upon a rear collision, more impact load is applied, increased by an impact load corresponding to the seating sensor mechanism 50, to a coupling bracket 23L coupled to the cushion side frame 21L as compared to an impact load applied to coupling bracket 23R attached to the cushion side frame 21R. For this reason, the configurations of the coupling bracket 23L and the coupling bracket 23R as illustrated in FIGS. 6 and 7 are also employed for the vehicle seat frame F2 so that the coupling bracket 23R (a weak portion 237R) is more easily deformable as compared to the coupling bracket 23L (a weak portion 237L). Thus, in the vehicle seat frame F2, adjustment can be made such that a deformation amount becomes equal between the coupling bracket 23L and the coupling bracket 23R.

Next, a vehicle seat frame F3 of a third embodiment of the present disclosure is described with reference to FIGS. 10, 11A, and 11B. The vehicle seat frame F3 of the third embodiment is different from the vehicle seat frame F1 of the first embodiment in that a cushion side frame 21L and a seat back side frame 12L are coupled together through a coupling bracket 123L that is not provided with a weak portion, but is the same as the vehicle seat frame F1 on other points. Differences are mainly described below.

Figure 10:
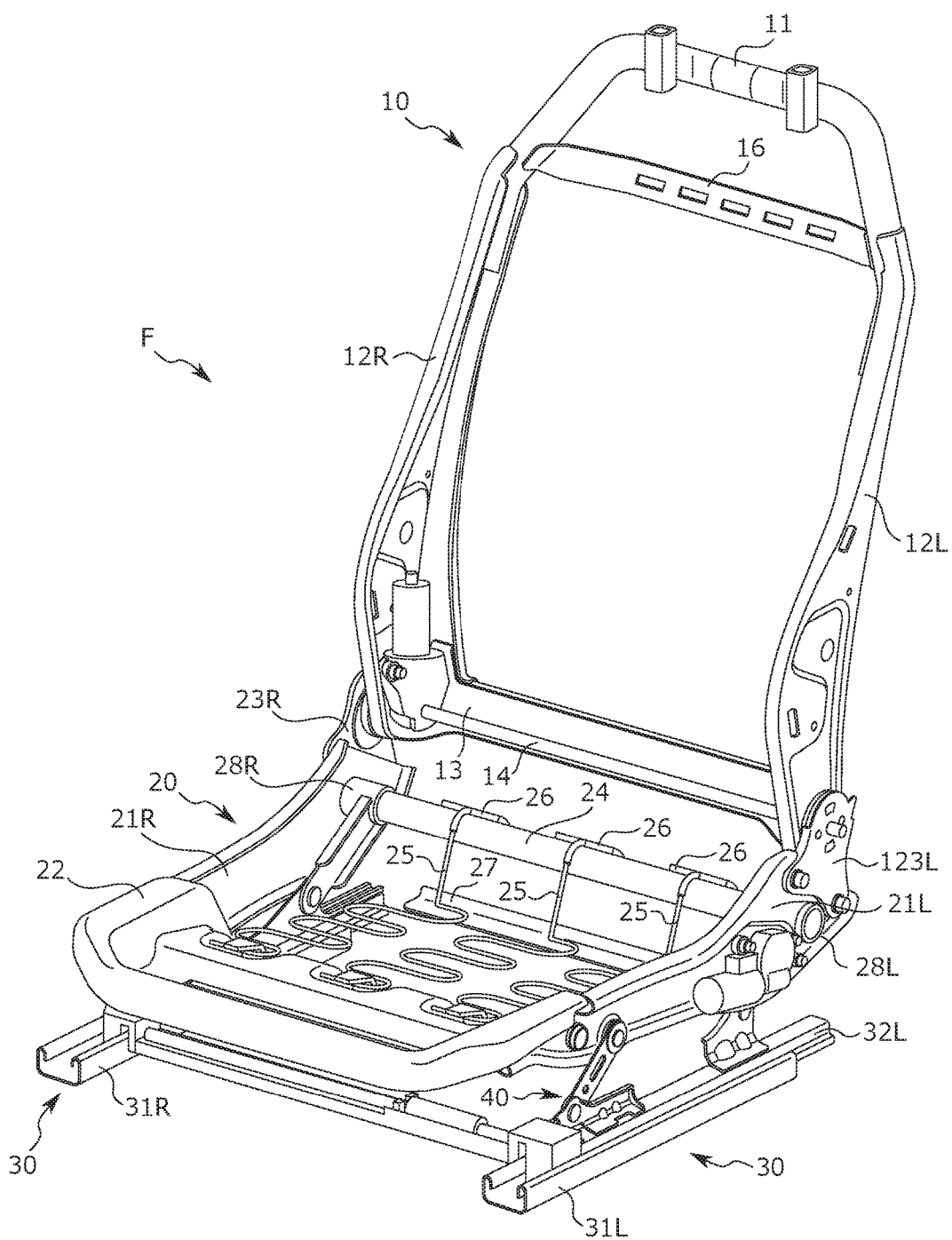
FIG. 10 is a perspective view of a vehicle seat frame of a third embodiment.

FIG. 10 illustrates a perspective view of the vehicle seat frame F3 of the third embodiment. FIG. 11A illustrates a front view and FIG. 11B illustrates a side view of the coupling bracket 123L coupling a frame provided with a main driving portion 40M of a height adjustment mechanism 40.

As illustrated in FIG. 10, in the vehicle seat frame F3 of the third embodiment, an upper back end portion of the cushion side frame 21L is attached to a lower end portion of a seat back side frame 12L through the coupling bracket 123L.

Figures 11A, 11B:
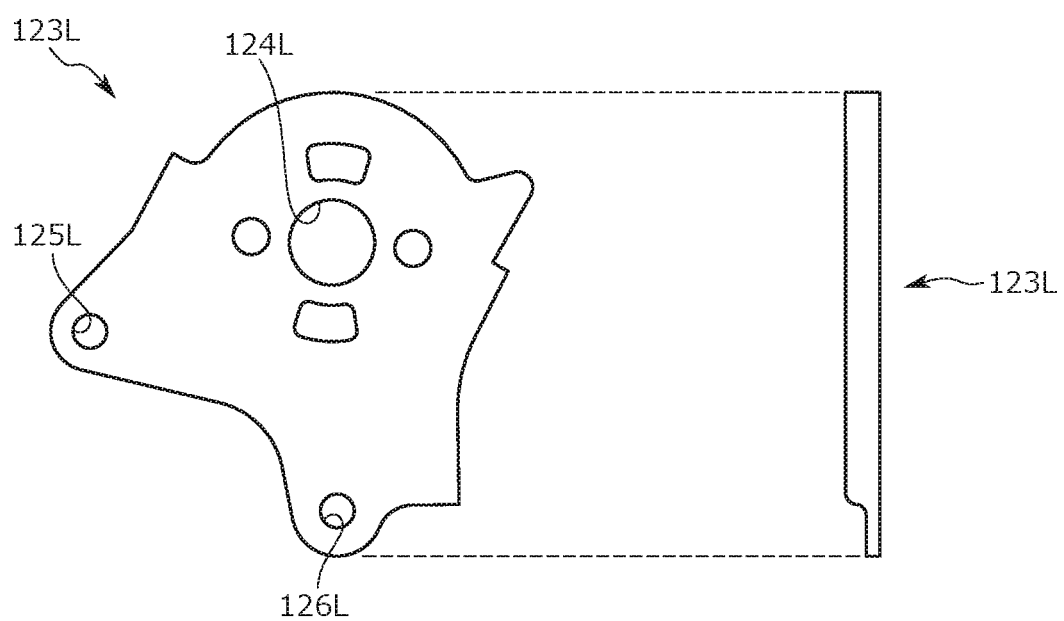
FIGS. 11A and 11B are front and side views of a coupling bracket configured to couple a frame provided with a main driving portion of a height adjustment mechanism at the vehicle seat frame of the third embodiment.

Moreover, as illustrated in FIG. 11A, the coupling bracket 123L has a shaft through-hole 124L for a reclining shaft 14 and bolt fastening holes 125L, 126L, through each of which a bolt penetrates for fastening the cushion side frame 21L and the coupling bracket 123L together. Note that a reclining mechanism is attached to a reclining shaft 14, and a seat back frame 10 is coupled to the coupling bracket 123L through the reclining mechanism.

Note that as illustrated in FIGS. 11A and 11B, the coupling bracket 123L is not provided with a weak portion in such a shape that the weak portion is easily deformable upon impact input. That is, no portion bent outward from the vehicle seat frame is, unlike the coupling bracket 23L, provided between the shaft through-hole 124L and the bolt fastening hole 126L at the coupling bracket 123L. On the other hand, a coupling bracket 23R has a weak portion 237R as illustrated in FIGS. 7A and 7B, and therefore, the coupling bracket 23R (the weak portion 237R) can be more easily deformable as compared to the coupling bracket 123L. With this configuration, even in a case where more impact load is applied, e.g., increased by an impact load corresponding to the main driving portion 40M of the height adjustment mechanism 40, to the coupling bracket 123L attached to the cushion side frame 21L as compared to the coupling bracket 23R attached to a cushion side frame 21R, adjustment can be made such that a deformation amount becomes equal between the coupling bracket 123L and the coupling bracket 23R. Note that the shape of the weak portion 237R of the coupling bracket 23R in the third embodiment is not limited to the shape illustrated in FIG. 7. For example, the weak portion 237R may be in such a shape that an offset amount is substantially zero as in the coupling bracket 23L illustrated in FIG. 6 or in other shapes.

The examples of the vehicle seat frame to which the present disclosure is applied have been mainly described above, but the present disclosure is also similarly applicable to other vehicle seats for ships, airplanes, etc. Moreover, the above-described embodiments have been set forth merely as examples for the sake of easy understanding of the present disclosure, and are not intended to limit the present disclosure. Changes and modifications can be made to the present disclosure without departing from the gist of the present disclosure, and needless to say, the present disclosure includes equivalents thereof.

For example, the weak portion provided at the coupling bracket is not limited to the form in which a portion of the coupling bracket is bent outward from the vehicle seat frame. For example, in the coupling bracket, the weak portion may be formed in such a manner that the strength of a metal structure of a portion forming the weak portion is decreased relative to the strength of portions forming other portions than the weak portion, or may be formed in such a manner that a bead for inducing bending is provided at the coupling bracket.

Moreover, in the above-described embodiments, the example where the main driving portion 40M of the height adjustment mechanism 40 or the seating sensor mechanism 50 is provided at the left frame has been described as an example, but the main driving portion 40M of the height adjustment mechanism 40 or the seating sensor mechanism 50 may be provided at the right frame. In this case, the coupling bracket coupling the right frame may be configured to be less deformable upon a rear collision as compared to the coupling bracket coupling the left frame (e.g., the offset amount of the coupling bracket coupling the right frame is decreased than that of the coupling bracket coupling the left frame).

TABLE OF REFERENCE NUMERALS

10: seat back frame
11: upper frame
12L, 12R: seat back side frame
13: lower member frame

TABLE OF REFERENCE NUMERALS

14: reclining shaft
16: upper cross member
20: seat cushion frame
21L, 21R: cushion side frame
22: pan frame
23L, 23R, 123L: coupling bracket
24: coupling pipe
25: S-spring
26: engagement hook
27: fixing bracket
28L, 28R: end sleeve
30: slide rail mechanism
32L: upper rail
32a, 32b: link support portion
40: height adjustment mechanism
40M: main driving portion
41: main driving link
41a: sector gear
41b, 43a, 43b: pivot pin
41r, 44r: cutout portion
42: pinion gear
43, 44: driven link
50: seating sensor mechanism
50A: seat position sensor
50B: seat weight sensor
51A, 51B: bracket
124L, 231L, 231R: shaft through-hole
125L, 126L, 232L, 232R, 233L, 233R: bolt fastening hole
235L, 235R: seat-back-side coupling region
236L, 236R: cushion-side coupling region
237L, 237R: weak portion
F1, F2, F3: vehicle seat frame
S: vehicle seat
S1: seat back
S2: seat cushion
S3: head rest

The invention claimed is:

1. A vehicle seat frame comprising:
a seat cushion frame;
a seat back frame;
a first coupling bracket configured to couple a first cushion side frame as a side frame of the seat cushion frame on one side of the vehicle seat frame and a first seat back side frame as a side frame of the seat back frame on the one side; and
a second coupling bracket configured to couple a second cushion side frame as a side frame of the seat cushion frame on an other side of the vehicle seat frame and a second seat back side frame as a side frame of the seat back frame on the other side;
wherein the first coupling bracket includes
a first seat-back-side coupling region having a portion to be coupled to the first seat back side frame,
a first cushion-side coupling region having a portion to be coupled to the first cushion side frame, and
a first weak portion that connects the first seat-back-side coupling region and the first cushion-side coupling region together;
wherein the second coupling bracket includes
a second seat-back-side coupling region having a portion to be coupled to the second seat back side frame,
a second cushion-side coupling region having a portion to be coupled to the second cushion side frame, and
a second weak portion that connects the second seat-back-side coupling region and the second cushion-side coupling region together; and
wherein an offset amount in a seat width direction between a surface forming the first seat-back-side coupling region and a surface forming the first cushion-side coupling region at the first coupling bracket is different from an offset amount in the seat width direction between a surface forming the second seat-back-side coupling region and a surface forming the second cushion-side coupling region at the second coupling bracket.

2. The vehicle seat frame of claim 1, wherein the first weak portion and the second weak portion are different from each other in their respective shapes.

3. The vehicle seat frame of claim 1, wherein:
the first weak portion is bent outward from the vehicle seat frame with respect to the first seat-back-side coupling region and the first cushion-side coupling region; and
the second weak portion is bent outward from the vehicle seat frame with respect to the second seat-back-side coupling region and the second cushion-side coupling region.

4. The vehicle seat frame of claim 1, wherein the surface forming the first seat-back-side coupling region and the surface forming the first cushion-side coupling region are positioned within a same plane, and
the surface forming the second cushion-side coupling region is positioned inward or outward of the vehicle seat frame with respect to the surface forming the second seat-back-side coupling region.

5. The vehicle seat frame of claim 1, wherein the second weak portion is formed to be more easily deformable upon impact absorption as compared to the first weak portion.

6. The vehicle seat frame of claim 4, wherein a main driving portion of a height adjustment mechanism configured to adjust a height of the seat is provided only at the first cushion side frame of the first and second cushion side frames.

7. The vehicle seat frame of claim 4, wherein a seating sensor mechanism configured to detect seating of a passenger is provided only at the first cushion side frame of the first and second cushion side frames.

8. The vehicle seat frame of claim 3, wherein deformability upon impact absorption is different between the first weak portion of the first coupling bracket and the second weak portion of at the second coupling bracket.

9. A vehicle seat, comprising the vehicle seat frame according to claim 1.

* * * * *